US009408472B2

(12) United States Patent
Kim

(10) Patent No.: US 9,408,472 B2
(45) Date of Patent: Aug. 9, 2016

(54) LEG REST DEVICE

(71) Applicants: Hyundai Motor Company, Seoul (KR); KIA MOTORS CORP., Seoul (KR)

(72) Inventor: Bong Ku Kim, Gunpo-si (KR)

(73) Assignees: Hyundai Motor Company, Seoul (KR); KIA MOTORS CORP., Seoul (KR)

( * ) Notice: Subject to any disclaimer, the term of this patent is extended or adjusted under 35 U.S.C. 154(b) by 0 days.

(21) Appl. No.: 14/535,063

(22) Filed: Nov. 6, 2014

(65) Prior Publication Data
US 2016/0000227 A1    Jan. 7, 2016

(30) Foreign Application Priority Data
Jul. 4, 2014    (KR) .................. 10-2014-0083913

(51) Int. Cl.
*A47C 7/50* (2006.01)
*B60N 2/44* (2006.01)
*B64D 11/06* (2006.01)
*B60N 2/02* (2006.01)

(52) U.S. Cl.
CPC .............. *A47C 7/506* (2013.01); *B60N 2/4495* (2013.01); *B64D 11/0643* (2014.12); *B60N 2002/024* (2013.01)

(58) Field of Classification Search
CPC ........ A47C 1/034; A47C 1/0355; A47C 7/50; A47C 7/506; B60N 2/4495; B60N 3/063; B64D 11/0643
USPC ....... 297/69, 84, 85 R, 85 M, 423.19, 423.26, 297/423.28, 423.3
See application file for complete search history.

(56) References Cited

U.S. PATENT DOCUMENTS

| | | | | |
|---|---|---|---|---|
| 2,871,917 A | * | 2/1959 | Schliephacke | A47C 1/0355 297/85 R |
| 3,014,758 A | * | 12/1961 | Schliephacke | A47C 1/035 297/89 |
| 3,140,893 A | * | 7/1964 | Schliephacke | A47C 1/0345 297/85 R |
| 3,794,381 A | * | 2/1974 | Caldemeyer | A47C 7/506 297/423.22 |
| 5,505,519 A | * | 4/1996 | Natt | B60N 2/28 297/250.1 |
| 2002/0113476 A1 | * | 8/2002 | Enno | B64D 11/06 297/330 |
| 2013/0313867 A1 | * | 11/2013 | Kuno | B60N 2/62 297/83 |
| 2013/0341989 A1 | * | 12/2013 | Lin | A47C 7/506 297/423.28 |
| 2014/0145476 A1 | * | 5/2014 | Nagayasu | B60N 2/22 297/86 |

FOREIGN PATENT DOCUMENTS

| | | | | |
|---|---|---|---|---|
| GB | 813023 A | * | 5/1959 | ........... A47C 1/0355 |
| JP | H11-332688 A | | 12/1999 | |
| JP | 2002-240598 A | | 8/2002 | |

(Continued)

*Primary Examiner* — Ryan Kwiecinski
(74) *Attorney, Agent, or Firm* — Morgan, Lewis & Bockius LLP

(57) ABSTRACT

A leg rest device may a first link member rotatably installed in a front of a seat frame, a second link member installed on a leg plate for supporting legs of a passenger and connected to the first link member to be movable along a longitudinal direction of the first link member, a guide member, one end of which is installed in the seat frame to be rotatable together with the first link member and the other end of which is connected to the second link member to be movable along a longitudinal direction of the second link member, and a driving portion installed in the seat frame. The driving portion, when operating, provides power for the first link member to be rotated, and allows the second link member to be rotated and simultaneously to be moved in the longitudinal direction of the first link member as the guide member is rotated together with the first link member.

7 Claims, 3 Drawing Sheets

(56) References Cited

FOREIGN PATENT DOCUMENTS

| | | |
|---|---|---|
| JP | 2006-198104 A | 8/2006 |
| JP | 2012-16992 A | 1/2012 |
| JP | 2013-248109 A | 12/2013 |
| KR | 10-2012-0045648 A | 5/2012 |
| KR | 10-1180677 B1 | 9/2012 |
| KR | 10-2013-0073220 A | 7/2013 |
| KR | 2013-248109 A | 12/2013 |
| KR | 10-2014-0032172 A | 3/2014 |

* cited by examiner

LEG REST DEVICE

CROSS-REFERENCE TO RELATED APPLICATION

The present application claims priority of Korean Patent Application Number 10-2014-0083913, filed Jul. 4, 2014, the entire contents of which application are incorporated herein for all purposes by this reference.

BACKGROUND OF INVENTION

1. Field of Invention

The present invention relates to a leg rest device for supporting the lower portion of legs of a passenger, and more particularly, to a leg rest device in which an angle of leg rest is adjusted, and simultaneously a length thereof is also adjusted at the lower end of a seat cushion.

2. Description of Related Art

Generally, a seat is provided for a passenger to conveniently board thereon inside a vehicle and such a seat is composed of a seat cushion for supporting a heap portion of the passenger and a seat back on which the passenger can lean his/her back and waist.

Further, various convenient devices are installed for comfort and convenience of seating of a passenger in a seat and a leg rest for supporting a calf portion of the passenger seating on the seat among such convenient devices is installed so as to support the back, waist, heap, and legs of the passenger.

Such a conventional leg rest is rotated in the front of a seat cushion to support the legs of a passenger, however when the passenger has long legs, there is a limit to supporting comfortably the legs of the passenger with the leg rest that is simply rotated.

Even though a leg rest is rotated at the lower end of a seat cushion through a link structure in a leg rest device described in a conventional art, it causes problems in that as the device is provided with a complicated link and thus the number of parts is increased, and further as movement trace of the link is bigger when the device is operated, a space required for installing the device is also increased.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to solve the above drawbacks and/or other problems, and the present invention is to provide a leg rest device in which an angle and length of a leg rest is adjustable when operating the leg rest, thereby more comfortably supporting the leg portion of a passenger.

In various aspects, the present invention provides a leg rest device, including: a first link member that is rotatably installed in a front of a seat frame; a second link member which is installed on a leg plate for supporting legs of a passenger and is connected to the first link member so as to be movable along a longitudinal direction of the first link member; a guide member, one end of which is installed in the seat frame so as to be rotatable together with the first link member and the other end of which is connected to the second link member so as to be movable along a longitudinal direction of the second link member; and a driving portion that is installed in the seat frame and provides power for the first link member to be rotated, and allows the second link member to be rotated and simultaneously to be moved in the longitudinal direction of the first link member as the guide member is rotated together with the first link member when operating.

The second link member may be disposed at a front side of the first link member, a first extension groove may be formed on a side surface of the first link member along the longitudinal direction of the first link member, and a connection portion may be formed on an upper end of the second link member and is connected to the first extension groove to be slidingly movable. The connection portion of the second link member may be formed on a rear side of the second link member at the upper end so that the connection portion is moved forwardly along the first extension groove of the first link member when the driving portion is operated.

A second extension groove may be formed on a side surface of the second link member along the longitudinal direction of the second link member and the other end of the guide member may be connected to the second extension groove and to be slidingly movable along the second extension groove. The other end of the guide member may be connected to the second extension groove such that the other end of the guide member is moved rearwardly along the second extension groove of the second link member when the driving portion is operated.

The guide member may be installed on the seat frame so that one end thereof is rotated together with the first link member and the other end thereof is extended to be inclined upward over the first link member to be connected to the second link member.

The driving portion may include a driving motor which is forwardly and reversely rotatable.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated by the accompanying drawings which are given hereinbelow by way of illustration only, and thus are not limitative of the present invention, and wherein.

Figure 1:
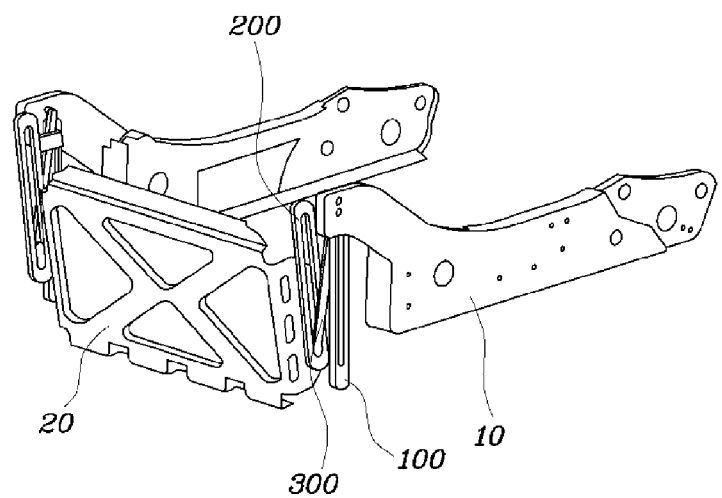
FIG. 1 is a perspective view illustrating an exemplary leg rest device according to the present invention.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 2:
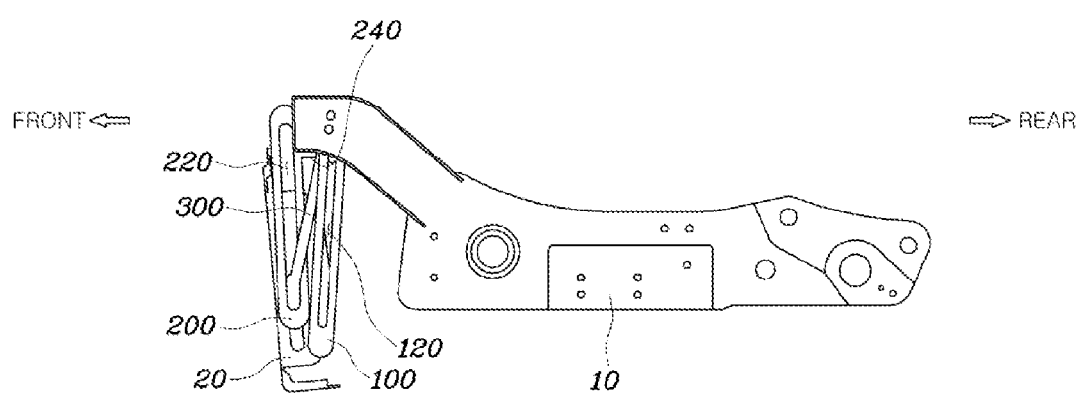
FIG. 2 is a side view illustrating an exemplary leg rest device according to the present invention.
Figure 3:
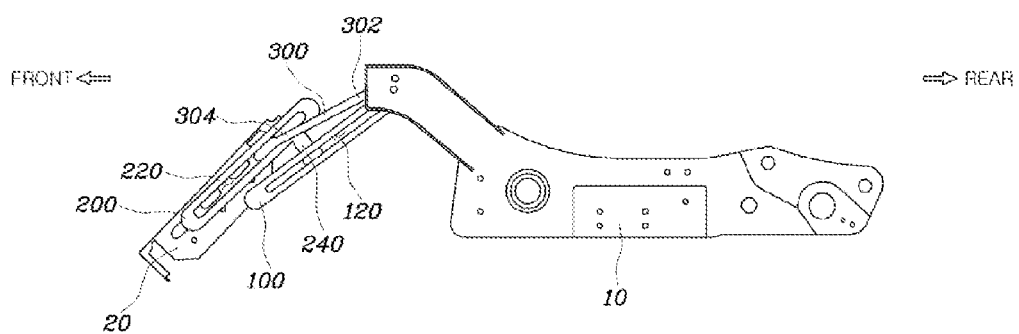
FIG. 3 is a view illustrating an operational state of an exemplary leg rest device of FIG. 2.
Figure 4:
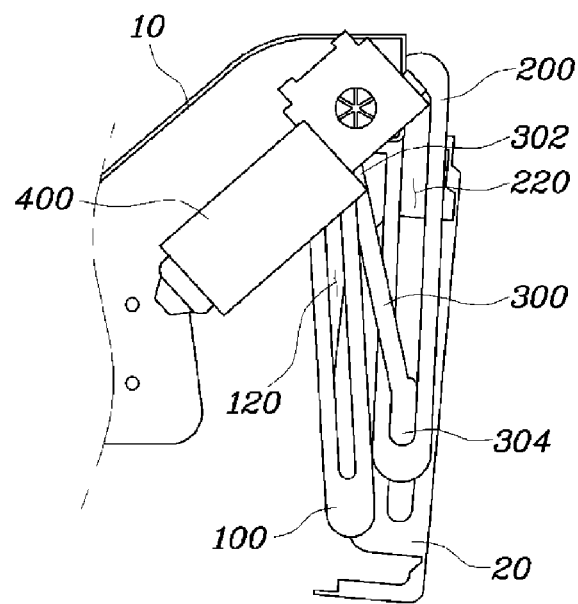
FIG. 4 and FIG. 5 are views illustrating an exemplary leg rest device of FIG. 2.
Figure 5:
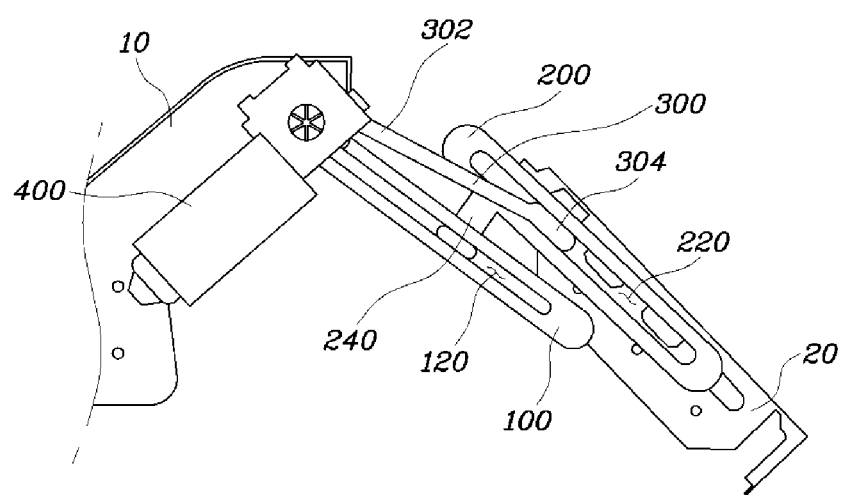

FIG. 1 is a perspective view illustrating a leg rest device according to various embodiments of the present invention, FIG. 2 is a side view illustrating a leg rest device according to various embodiments of the present invention, and FIG. 3 is a view illustrating an operational state of a leg rest device of FIG. 2.

A leg rest device according to various embodiments of the present invention may include: a first link member 100 that is rotatably installed in the front of a seat frame 10; a second link member 200 which is installed on a leg plate 20 for supporting the legs of a passenger and is connected to the first link member 100 so as to be movable along a longitudinal direction; a guide member 300 one end 302 of which is installed in the seat frame 10 so as to be rotatable together with the first link member 100 and the other end 304 of which is connected to the second link member 200 so as to be movable along a longitudinal direction; and a driving portion 400 that is installed in the seat frame 10 and provides power for the first link member 100 to be rotated, and allows the second link member 200 to be rotated and simultaneously to be moved in a longitudinal direction of the first link member 100 as the guide member 300 is rotated together with the first link member 100 when operating.

A seat cushion may be provided on the upper side of the seat frame 10 and the first link member 100 is rotatably installed in the front of the seat frame 10 wherein the first link member 100 may be on the seat frame 10 through a separate rotation bracket and may be connected with a hinge structure in order to achieve a rotational movement.

Meanwhile, the second link member 200 may be fixed to a leg plate 20 for supporting the legs of a passenger, and may be installed on the seat frame 10 together with the first link member 100 so as to rotate together with the first link member 100. Here, the second link member 200 may be connected to the first link member 100 to be rotated, and simultaneously may be connected to be movable in the front and rear in the longitudinal direction of the first link member 100 during the movement of rotation.

In detail, the second link member 200 may be disposed on the upper side of the first link member 100, a first extension groove 120 may be formed along a longitudinal direction at a side of the first link member 100, and a connection portion 240 may be formed on the upper end of the second link member 200 to be slidingly movable to the first extension groove 120. In some embodiments, the connection portion 240 may be formed on the lower end of the second link member 200 to be slidingly movable along the first extension groove 120.

In more detail, a protrusion which is inserted into the first extension groove 120 may be formed laterally on the connection portion 240 of a second link member 200 and the protrusion is inserted into the side of the first extension groove 120 of the first link member 100 so that the second link member 200 is rotated together with the rotation of a first link member 100 and the second link member 200 is moved along the longitudinal direction of the first link member 100 in link with a guide member 300 to be described below.

As described above, the connection portion 240 that is inserted into the first extension groove 120 of the first link member 100 may be formed at the upper end of rear side of the second link member 200 so that the connection portion 240 is moved from the rear of the first link member 100 to the front thereof when operating the driving portion 400.

In the present invention, the leg plate 20 for supporting the legs of a passenger may be moved forwardly and a length thereof is varied while it is rotated when using a leg rest. To this end, the connection portion 240 is formed at the upper end of rear side of the second link member 200, and the second link member 200 is rotated together with the first link member 100 and simultaneously is to be moved from the rear to the front when using the leg rest, while the connection portion 240 is inserted into the rear side of the first extension groove 120 of the first link member 100, so that movements of rotation and advance are simultaneously to be performed.

Here, the connection portion 240 of the second link member 200 is rotated or moved in the first extension groove 120 of the first link member 100, and at this time it generates a friction and thus a separate bearing may be applied thereto or it may be rolled-friction Meanwhile, according to the present invention a guide member 300 for an advance movement of the second link member 200 is provided. In detail, the guide member 300 one end 302 of which is installed rotatably together with the first link member 100 on the seat frame 10 and the other end 304 of which is connected to the second link member 200 so as to be movable along a longitudinal direction.

That is, the guide member 300 one end 302 of which may be connected to the seat frame 10 at a side of the first link member 100 and the other end 304 of which is connected to the second link member 200 so that when the second link member 200 is rotated, the first link member 100 is to be rotated.

Here, one end 302 of the guide member 300 may be rotated simultaneously together with the first link member 100 by receiving power from the driving portion 400 together with the first link member 100. In this case, the guide member 300 may be rotated together with the first link member 100 on one end 302 thereof when the driving portion 400 is operated, and the other end 304 of which is connected to the second link member 200 so that the second link member 200 is rotated and simultaneously is moved in the front and rear direction.

Specifically, a second extension groove 220 may be formed along a longitudinal direction at the side surface of the second link member 200 and the other end 304 of the guide member 300 may be connected so as to be slidingly movable along the second extension groove 220.

As described above, the second extension groove 220 may be formed in a longitudinal direction at the side surface of the second link member 200 and a protrusion is formed in a side direction at the other end 304 of the guide member 300 so as to be inserted into the second extension groove 220 so that the second link member 200 may be rotated by the guide member 300, and simultaneously moved in a front and rear direction.

However, the other end 304 of the guide member 300 may be connected to the front side of the second extension groove 220 so that the other end 304 is moved from the front of a second link member 200 to the rear thereof when the driving portion 400 is operated.

In a case where the other end 304 of the guide member 300 is connected to the rear side of the second extension groove 220, the second link member 200 may be moved in a rear direction together with the guide member 300 when the driving portion 400 is operated so that a leg plate 20 may not be advanced.

Accordingly, the other end 304 of the guide member 300 may be connected to the front side of the second extension groove 220 of the second link member 200 so that the other end 304 of the guide member 300 is smoothly moved to a spare of the second extension groove 220 during a rotation movement and thereby movement of the second link member 200 may be performed.

Meanwhile, the guide member 300 may be installed on a seat frame 10 so that one end 302 thereof is rotated together with the first link member 100 and the other end 304 thereof is extended upward over the first link member 100 to be inclined at a predetermined angle to be connected to the second link member 200.

As described above, the first link member 100 and the second link member 200 may be connected so as to form a predetermined angle so that the second link member 200 connected to be freely moved at the first link member 100 is rotated, and simultaneously is moved in a longitudinal direction by an angle adjustment of the guide member 300.

That is, the first link member 100 and the guide member 300 may be configured such that they are rotatable while their positions are fixed to a seat frame 10, the second link member 200 connected to the first link member 100 to be freely movable is restrained in its movement in the front and rear direction by the guide member 300, and the other end 304 of the guide member 300 connected at a predetermined angle pushes the second link member 200 so that movement in the longitudinal direction of the second link member 200 is achieved.

Meanwhile, the driving portion 400 may be configured with a driving motor which is forwardly and reversely rotatable. A driving motor which is forwardly and reversely rotatable is applied to a driving portion 400 so that a forward rotation and advance movement, or a reverse rotation and retreat movement of a leg rest can be freely performed. Such a driving portion 400 may be configured such that a manual manipulation is possible using a dial as well as a driving motor.

Describing the operation of the present invention referring to FIGS. 2 and 3, as shown in FIG. 2, a first link member 100 and a second link member 200 are fixed toward the lower portion so that a leg plate 20 is folded at the lower side of a seat cushion in normal times. Here, a connection portion 240 of the second link member 200 is disposed at the rear side of a first extension groove 120 of the first link member 100 and the other end 304 of a guide member 300 maintains a state where it is disposed at the front side of the first link member 100.

Meanwhile, when using the leg plate 20, as the first link member 100 is rotated by operation of the driving portion 400, the second link member 200 is simultaneously rotated. Here, the second link member 200 is connected to be movable in a front and rear direction along the longitudinal direction of the first link member 100, but the other end 304 of the guide member 300 is connected to the second link member 200 and pushes the second link member 200 and thereby the second link member 200 is rotated, and simultaneously is moved forward.

That is, during a rotation movement, as the other end 304 of the guide member 300 is moved from the front to the rear of a second link member 200, the connection portion 240 of the second link member 200 is moved from the rear of a first extension groove 120 of the first link member 100 to the front thereof so that rotation and advance movements of the leg plate 20 are finally performed.

According to the leg rest device configured as described above a length as well as an angle of a leg rest cab be adjusted thereby to more comfortably support the leg portion of a passenger.

In addition, the number of parts is decreased due to a simple structure and thereby production cost is reduced, weight is reduced, and installation is easy due to an advantage in terms of a package.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A leg rest device, comprising:
    a first link member rotatably directly connected to a front portion of a seat frame;
    a second link member which is installed on a leg plate for supporting legs of a passenger and is connected to the first link member so as to be movable along a longitudinal direction of the first link member;
    a guide member, a first end of which is connected to the front portion of the seat frame so as to be rotatable together with the first link member and a second end of which is connected to the second link member so as to be movable along a longitudinal direction of the second link member; and
    a driving portion that is connected to the seat frame and provides power for the first link member to be rotated, and allows the second link member to be rotated and simultaneously to be moved in the longitudinal direction of the first link member as the guide member is rotated together with the first link member when operating.

2. The leg rest device of claim 1, wherein the second link member is disposed at a front side of the first link member, a first extension groove is formed on a side surface of the first link member along the longitudinal direction of the first link member, and a connection portion is formed on an upper end of the second link member and is connected to the first extension groove to be slidingly movable.

3. The leg rest device of claim 2, wherein the connection portion of the second link member is formed on a rear side of the second link member at the upper end so that the connection portion is moved forwardly along the first extension groove of the first link member when the driving portion is operated.

4. The leg rest device of claim 1, wherein a second extension groove is formed on a side surface of the second link member along the longitudinal direction of the second link member and the second end of the guide member is connected to the second extension groove and is slidingly movable along the second extension groove.

5. The leg rest device of claim 4, wherein the second end of the guide member is connected to the second extension groove such that the second end of the guide member is moved rearwardly along the second extension groove of the second link member when the driving portion is operated.

6. The leg rest device of claim 1, wherein the guide member is installed on the seat frame so that the first end thereof is rotated together with the first link member and the second end thereof is extended to be inclined upward over the first link member to be connected to the second link member.

7. The leg rest device of claim 1, wherein the driving portion includes a driving motor which is forwardly and reversely rotatable.

\* \* \* \* \*